United States Patent
Kumar

(10) Patent No.: US 6,932,300 B2
(45) Date of Patent: Aug. 23, 2005

(54) DEVICE FOR CLOSING PARACHUTE PACKS

(75) Inventor: Naresh Kumar, Singapore (SG)

(73) Assignee: DSO National Laboratories, Singapore (SG)

( * ) Notice: Subject to any disclaimer, the term of this patent is extended or adjusted under 35 U.S.C. 154(b) by 29 days.

(21) Appl. No.: 10/481,868

(22) PCT Filed: Jun. 21, 2002

(86) PCT No.: PCT/SG02/00134

§ 371 (c)(1),
(2), (4) Date: Dec. 18, 2003

(87) PCT Pub. No.: WO03/000548

PCT Pub. Date: Jan. 3, 2003

(65) Prior Publication Data

US 2004/0155152 A1 Aug. 12, 2004

(51) Int. Cl.$^7$ .................................................. B64D 17/46
(52) U.S. Cl. ....................................................... 244/148
(58) Field of Search .................... 244/148; 242/394, 242/611; 254/217; 53/137.2; 410/100

(56) References Cited

U.S. PATENT DOCUMENTS

| | | | | | |
|---|---|---|---|---|---|
| 2,335,589 A | * | 11/1943 | Fremeau | ...................... | 254/217 |
| 2,357,828 A | * | 9/1944 | Willard | ...................... | 53/137.2 |
| 2,663,525 A | * | 12/1953 | Floyd | ........................... | 244/148 |
| 2,711,869 A | * | 6/1955 | Carroll | ...................... | 244/148 |
| 5,125,599 A | * | 6/1992 | Sherman | ..................... | 244/148 |
| 5,156,506 A | * | 10/1992 | Bailey | ......................... | 410/100 |

FOREIGN PATENT DOCUMENTS

| | | |
|---|---|---|
| DE | 2809109 | 9/1979 |
| FR | 2479136 | 3/1980 |
| IT | 1268097 | 2/1997 |

* cited by examiner

*Primary Examiner*—Galen Barefoot
(74) *Attorney, Agent, or Firm*—Pillsbury Winthrop LLP

(57) ABSTRACT

The invention provides a device for closing parachute packs, each of which has a plurality of flaps and a closing cord (36), the device (10) being characterised by a base (12) for bearing on a flap in one direction during the packing operation, and by a mechanism (18, 22) adapted to draw a pull cord (34) connectable to the closing cord (36) in substantially an opposite direction to allow the flaps to be secured relative to the closing cord (36) by a pin.

23 Claims, 6 Drawing Sheets

DEVICE FOR CLOSING PARACHUTE PACKS

FIELD OF THE INVENTION

The present invention relates to a device that aids the closing of a parachute pack, particularly in compressing the pack flaps of a packing tray of a parachute and aiding in securing the same during closure.

BACKGROUND OF THE INVENTION

The process of packing parachutes involves folding a canopy, packing the folded canopy into a packing tray and finally closing the packing tray. Currently, the closing of the packing tray is the most strenuous part of the packing process, as it involves physically demanding activities on the riggers who pack the canopy, such as pulling the closing string of the packing tray, jumping on the packing tray and pounding, it to compact the packing tray and contents. Since the packing is done manually and repetitively by riggers, riggers often unconsciously adopt undesirable postures that put themselves under severe musculoskeletal strain and at the risk of injury. Over prolonged periods, they tend to complain of chronic neck, shoulder and backache that are caused directly by the physical demands of packing the parachutes.

It may take as many as three riggers, and as long as fifteen minutes to close and pack one parachute. Furthermore, due to the strenuous and repetitive nature of the packing task, long periods of rest have to be assigned to the riggers. This disrupts their work-cycle and reduces their productivity. It may also necessitate their having to take medical leave from their work for physical injuries obtained. Thus, it would be desirable to have a tool or device to reduce the time taken to pack a parachute and to help riggers avoid physiological strains in the course of their work.

SUMMARY OF INVENTION

An object of the present invention is thus to seek to provide a mechanical device to reduce the labour intensiveness of packing a parachute.

Accordingly in a first aspect the present invention consist a device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin; said device comprising:

a body structure including a base member defining parachute pack engageable regions for bearing onto the parachute pack;

a body structure mounted roller rotateably mounted about a rotational axis and with which a pull cord can engage to be drawn (at least in part) onto said roller and which in use, is connected (directly or indirectly) to the closing cord for drawing said closing cord in part through a said grommet;

a cranking mechanism for rotating said roller about its rotational axis, said cranking mechanism includes a movable handle rotatable about a cranking axis and operatively engaged with said roller to rotate said roller about the said rotational axis for said drawing of said pull cord, wherein said handle actuates rotation of said roller in one direction by movement of said handle in one direction only and in a direction opposite to said one direction, said handle does not actuate rotation of said roller.

Preferably said cranking mechanism allows said handle to move in an oscillating manner.

Preferably said handle oscillates, in use, through an arc of less than 180°.

Preferably the cranking axis of said handle is parallel to said rotational axis of said roller.

Preferably, the cranking axis of said handle is coaxial with said rotational axis of said roller.

Preferably said handle and said roller co-rotate.

Preferably said handle and said roller counter rotate.

Preferably said cranking mechanism includes a ratchet allowing the actuation of said roller in one direction (the drawing direction) by movement of said handle in said one direction and preventing movement of said roller in a direction opposite to said drawing direction, whilst still allowing said handle to move in its direction opposite.

Preferably said device further includes a means to switch engageable with said cranking mechanism, said means to switch operable in a first mode to operatively engage said handle and said roller for allowing rotating of said roller and in a second mode to disengage said handle and said roller for freeing said roller and allow said roller to rotate independent of said handle, in both directions.

Preferably said ratchet includes a moveable pawl rotationally disposed from said body structure and engageable with a complementary toothed structure disposed from said roller, said pawl capable of engaging with said teeth for establishing a ratchet like relationship.

Preferably said pawl is movable by pivoting relative to said body structure, to a position being of a non ratchet like relationship, with said toothed structure.

In a second aspect the present invention consists a device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:

a body structure including a base member defining parachute pack engageable surface or surfaces each being coplanar for bearing onto the parachute pack;

a body structure mounted roller rotateably mounted about a rotational axis and with which a pull cord can engage to be drawn (at least in part) on to said roller and which in use, is connected (directly or indirectly) to the closing cord for drawing said closing cord in part through a said grommet;

a cranking mechanism for rotating said roller about its rotational axis, said cranking mechanism includes a handle rotatable about a cranking axis and operatively engageable with said roller to rotate said roller about the said rotational axis for said drawing of said pull cord; and wherein a cross bar parallel to the rotational axis is provided to said body structure over which said pull cord can run and be guided by, said cross bar in use aligning said pull cord extending from said pack in a direction perpendicular to the surface(s) of said base and wherein the rotational axis of roller is offset from said cross bar and to one side of the said direction perpendicular passing through said cross bar, to thereby provide a non obstructing, by said roller, view in the perpendicular direction of said grommet.

In a third aspect the present invention consists a device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:

a body structure including a base member defining parachute pack engageable fingers for bearing onto the parachute pack;

a body structure mounted roller rotateably mounted about a rotational axis and with which a pull cord can engage to be drawn (at least in part) onto said roller and which in use, is connected (directly or indirectly) to the closing cord for drawing said closing cord in part through a said grommet;

a cranking mechanism for rotating said roller about its rotational axis, said cranking mechanism includes a handle operatively engageable with said roller to rotate said roller about the said rotational axis for said drawing of said pull cord, wherein said fingers are in a configuration pointing towards each other yet defining a gap which when in use, said fingers rest immediately adjacent said grommet of said flap of said parachute and wherein said grommet is exposed through said gap.

Preferably said base member includes at least two fingers

Preferably said base member includes four fingers.

Preferably said fingers extend inwardly towards the gap.

In a fourth aspect the present invention consists a device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:

a body structure including a base member defining parachute pack engageable regions for bearing onto the parachute pack;

a body structure mounted roller rotateably mounted about a rotational axis and with which a pull cord can engage to be drawn (at least in part) onto said roller and which in use, is connected (directly or indirectly) to the closing cord for drawing said closing cord in part through a said grommet;

a cranking mechanism for rotating said roller about its rotational axis, said cranking mechanism includes a handle rotatable about a cranking axis, wherein said roller includes, disposed on opposite axial ends of said roller a cranking mechanism receiving region with which said cranking mechanism can selectively engage, to connect said handle in operative engagement with said roller to rotate said roller about the said rotational axis for said drawing of said pull cord; and wherein said cranking mechanism is releasably fastenable at each opposite end of said roller for catering for left hand and right hand operation of the device.

Preferably each said cranking mechanism receiving region is a socket provided at each end of said roller for engagement with a complementary shaped protruding portion of the cranking mechanism.

Preferably said socket has at least one aperture on its peripheral surface for receiving with at least one biasing spigot of the protruded portion extending substantially perpendicular to the rotational axis for allowing the releasable fastening.

In a fifth aspect the present invention consists a device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:

a body structure including a base member defining parachute pack engageable regions for bearing onto the parachute pack;

a body structure mounted roller rotateably mounted about a rotational axis and with which a pull cord can engage to be drawn (at least in part) onto said roller and which in use, is connected (directly or indirectly) to the closing cord for drawing said closing cord in part through a said grommet;

a cranking mechanism for rotating said roller about its rotational axis, said cranking mechanism includes a handle rotatable about a cranking axis and operatively engageable with said roller to rotate said roller about the said rotational axis for said drawing of said pull cord, wherein said roller includes an anchor means for securing said pull cord to said roller, when said roller rotates, said anchor means being a pin projecting from the roller radially outwardly.

Preferably said pin is centrally placed on said roller.

Preferably there are two pins diametrically opposed to each other.

In a sixth aspect the present invention consists a device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:

a body structure including a base member defining parachute pack engageable regions for bearing onto the parachute pack;

a body structure mounted roller rotateably mounted about a rotational axis and with which a pull cord can engage to be drawn (at least in part) onto said roller and which in use, is connected (directly or indirectly) to the closing cord for drawing said closing cord in part through a said grommet;

a cranking mechanism for rotating said roller about its rotational axis, said cranking mechanism includes a handle rotatable about a cranking axis and operatively engageable with said roller to rotate said roller about the said rotational axis for said drawing of said pull cord, wherein said body structure further includes a handle rotation rotational limit means defining a limit of rotation in direction contrary to operative direction rotational direction of said handle.

Preferably said limit of rotation is provided by mutual engagement of surfaces of said handle and said body structure.

Preferably said surface of body structure is provided in a body recess within which a projection from said handle travels.

The present invention may in addition to any one of the above consist in a device for closing parachute packs, each of which has a plurality of flaps and a closing cord, the device being characterized by a base for bearing on a flap in one direction during the packing operation, and by a mechanism adapted to draw a pull cord connectable to the closing cord in substantially an opposite direction to allow the flaps to be secured relative to the closing cord by a pin.

It will be convenient to hereinafter describe an embodiment of the present invention with reference to the accompanying drawings which illustrate one form of device incorporating the invention. It Is to be understood that the particularity of the drawings and the related description is not to be understood as superseding the generality of the broad description of the invention as defined in the claims.

DETAILED DESCRIPTION OF THE PREFERRED EMBODIMENT OF THE INVENTION

Figure 1:
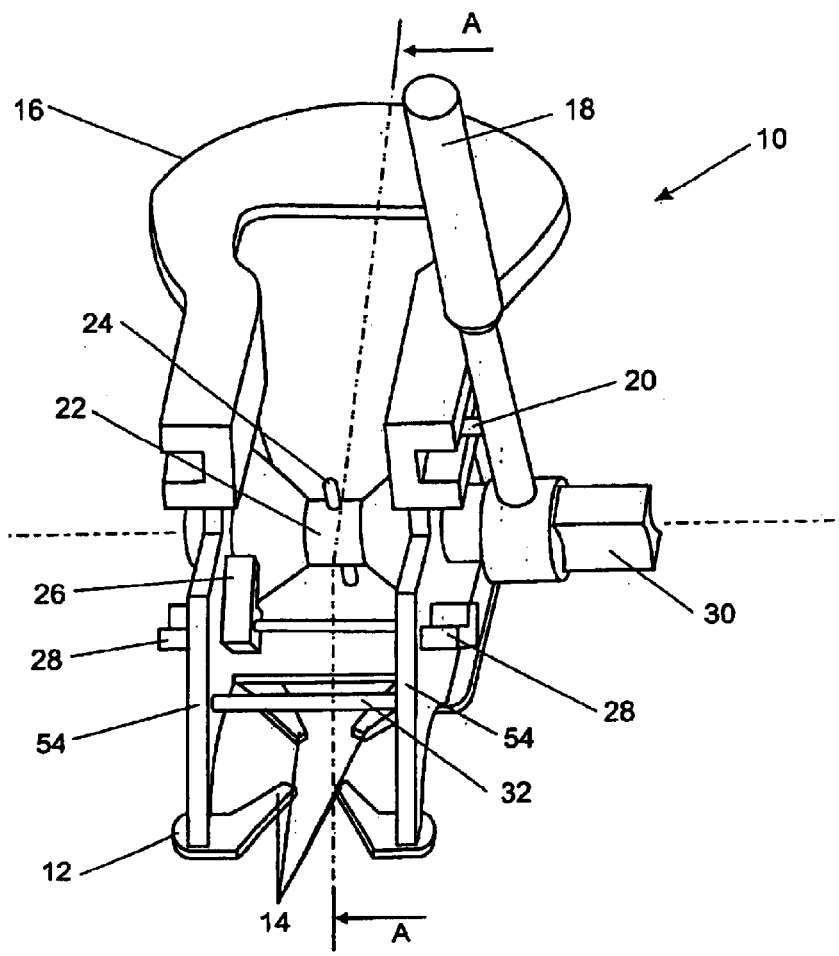
FIG. 1 is an isometric view of the parachute packing device according to the preferred embodiment of the invention.

FIG. 1 is an isometric view of the parachute packing device 10 according to the preferred embodiment of the invention. The device 10 comprises a body or frame 53 from which there is disposed a base 12 including brackets 14 in the form of for example protrusions or feet. The brackets may be of any form including a base plate with a hole in it which can allow the device to be placed on a parachute pack and prevent damage to the pack during the packing operation. The device also includes a grip 16 which can be grasped by the hand of a user for holding the device 10 in position during the packing operation.

The device further includes a one part in the form of a handle 18. The handle is pivotably mounted from the body 53 and a user can grip the handle and move this in a cranking like action about the pivot axis 54 relative to the housing. A handle stop 20 is preferably integrated with the handle 18 and fits into a groove in the body 53 of the device to prevent the handle 18 from moving past for a example a substantially vertical position contrary to the operation (winding) direction. The stop may alternatively be located on the body and engage with the handle at a certain angle of displacement of the handle relative to the body.

The device also includes a second part which is a means rotatable and preferably comes in the form of a roller or drum 22. The roller is mounted from the body of the device in a manner to allow rotation of the roller relative to the body. The mounting may be between two side panels 54 of the body and may use an axle mounted in bearings to allow for a relatively smooth and low friction rotation to occur. The roller has a peripheral surface about which at least in part, a pull cord 34 can be wound. To engage the pull cord to the roller at least one and preferably a pair of pegs 24 are affixed to the roller 22 such that the pegs 24 move with the rotation of the roller 22.

The parts (18, 22) form a mechanism which on a turning motion of the handle 18 gives rise to counter-rotating motion of the roller 22 in an opposite direction in what may be described as a cranking action. Rotation of the roller 22 is essentially restricted to one direction only by a roller lock 26 that cooperates with preferably one or both ends of the roller 22 in a ratchet-and-teeth arrangement. A release block 28 which is mounted on an axle with winch the roller lock(s) are mounted can be turned by a user to a condition to release the roller lock 26 from engagement with the ends of the roller 22. This axle is preferably also pivotably mounted between the two side structures or plates of the body.

A switch 30 is further located adjacent the handle 18. The switch 30 has two positions wherein a fist position engages the handle 18 to the roller 22 to allow the aforesaid cranking action, and a second position which releases the engagement such that the roller or drum 22 is allowed to rotate freely in both directions. A cross-bar 32 is included to aid in positioning and tensioning a pull-cord 34 and is located between the side structures or plates 54 in a manner to guide and set the angle of the pull cord to the roller.

During the packing of a canopy, a series of closing flaps 50 (usually seven) must be securely closed. Each flap must be closed tightly one at a time by compressing the flap relative to a closing loop so that the tip of the closing loop is exposed over a grommet of the flap. The closing loop is then secured by a temp pin for each loop that is closed. The compression of the flap relative to the closing loop is achieved by applying forces to the closing loop aid the flap in opposite directions. Traditionally, a pull cord 34 is used to pull the closing loop while the flap is being stepped on or otherwise constrained.

Figure 2:
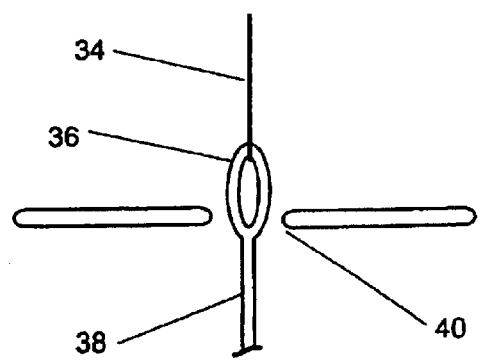
FIG. 2 shows the position of the closing loop of the closing cord just above the grommet for securing by a temp pin.

FIG. 2 shows the position of the closing loop 36 of the closing cord 38 just above the grommet 40 for securing by a temp pin (not shown). When the closing loop 36 is in the position shown in FIG. 4, the user should stop cranking the handle 18. In that position, the closing loop 36 is sufficiently exposed so that a temp pin can be inserted into the closing loop 36 to secure the flap.

Figure 3A:
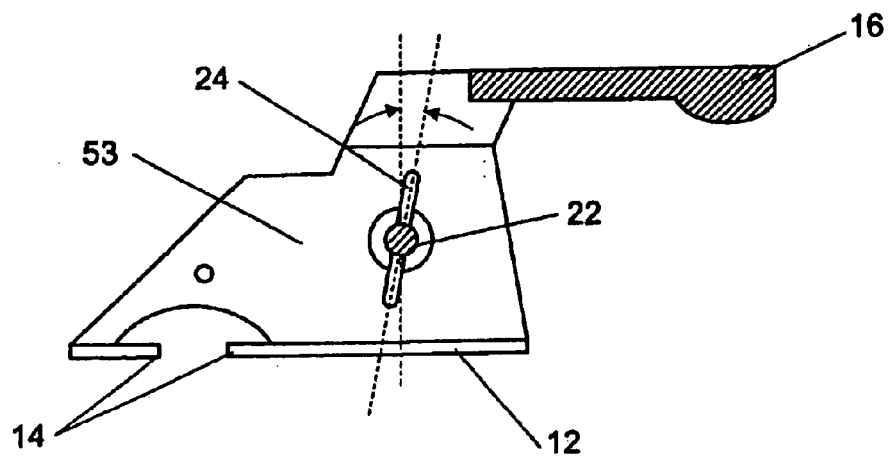
FIGS. 3(a) and 3(b) are cross-sectional views of the parachute packing device of FIG. 1 along section A—A illustrating a closing cord being hooked onto the peg of the device.

FIG. 3(a) is a cross-sectional view of the parachute packing device 10 of FIG. 1 along section A—A. The device 10 is placed on a flap (not shown) that is being compressed, such that its base 12 is resting on the flap and the brackets 14 are arranged so that the grommet 40 of the flap is substantially centred at the opening formed by the brackets 14. The pegs 24 on the roller 22 are oriented such that they are at a small angle past the vertical to prevent the pull cord from slipping off.

Figure 3B:
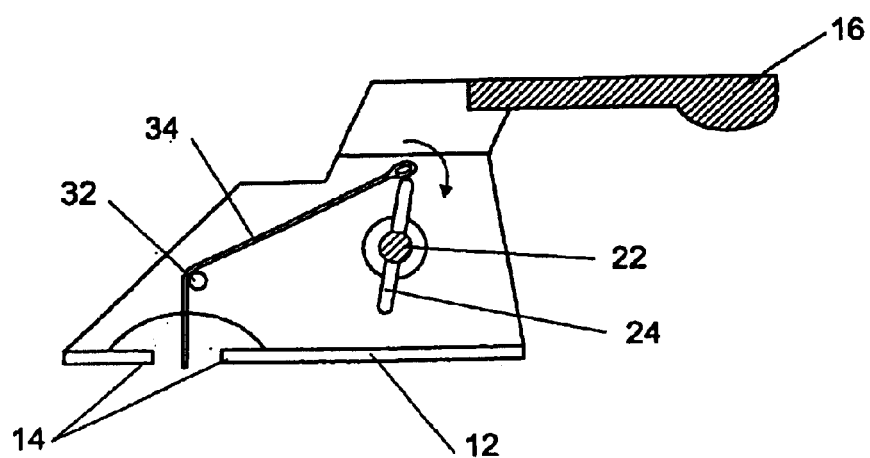

FIG. 3(b) shows a similar view to that of FIG. 3(a) but illustrates a pull cord 34 wherein a loop at its top end is booked onto the top of the peg 24. The parachute is first prepared by reading the closing loop 36 and pull cord 34 through the grommet 40 of the flap to be secured before hooking the pull cord 34 to the peg 24. Pulling on the pull cord 34 in the direction shown in FIG. 3(b) will result in the pulling of the closing loop relative to the flap until the top of the closing loop is exposed above the grommet. Once the top of the closing loop is exposed, a temp pin 51 is inserted into the closing loop to secure the flap. This action is repeated seven times if there are seven flaps to be secured. After the seventh flap is secured, a retaining pin is inserted into the closing loop and the packed parachute will be ready for use.

Figure 4:
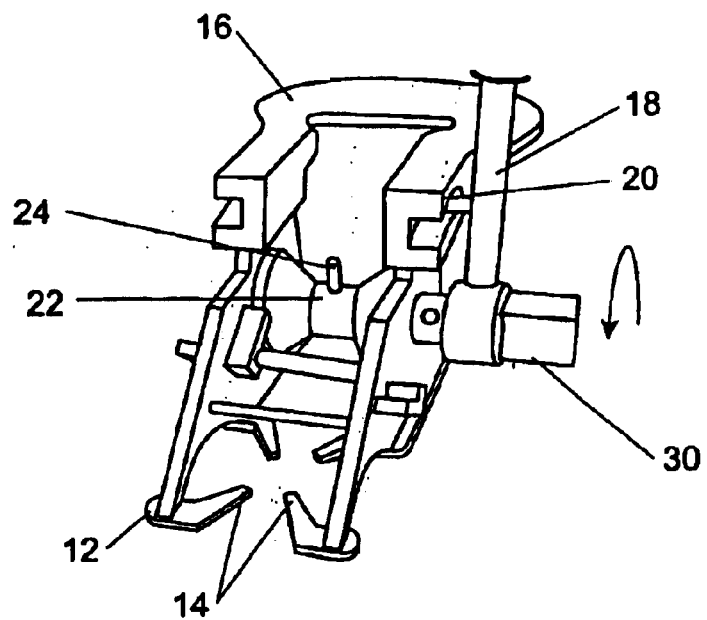
FIG. 4 shows the handle in a substantially upright position and about to be rotated.
Figure 5:
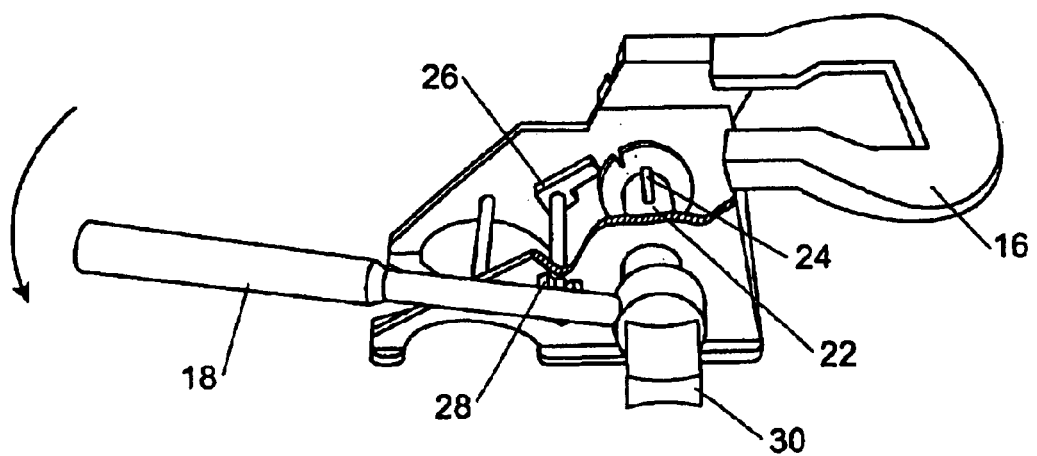
FIG. 5 is a side view of the device wherein the roller lock is released, thereby allowing the roller to unwind.

FIG. 4 shows the handle 18 in a substantially upright position and about to be rotated. The switch 30 should first be turned in the direction "E" indicated on the switch to engage the handle 18 to the roller 22 for cranking action. The pull cord 34 is threaded to the closing loop 36 and the top end of the pull cord 34 is booked onto the peg 24 as shown in FIG. 3(b). The handle 18 is pulled to crank the roller 22. As the roller 22 turns, the peg 24 draws the pull cord 34 which loops around the roller 22 as the roller 22 is rotated. In summary, the handle 18 is first cranked to place the pull cord under tension. Further cranking will pull the device closer to the flap and more of the pull cord 34 is exposed above the grommet 40. The handle is of a length sufficient to provide an adequate mechanical advantage in turning the roller. Alternatively or in addition a gearing arrangement may be provided to enhance the mechanical advantage that the user can rely on in cranking the pull cord to the position to allow the pin to be inserted. Such gearing can also provide for the counter rotation movement of the roller to the creating direction. Such counter rotation as can be seen from the configuration is desirable as the motion of the handle is in a direction in which ergonomically the user is provided with convenient operation FIG. 5 is a side view of the device 10 wherein the roller lock 26 is released, thereby allowing the roller 22 to unwind. To achieve this, the switch 30 is first turned to the release ("R") position. The handle 18 is then pushed onto the release block 28 until a "click" is Heard. The release block 28 will rotate the roller locks 26 away from the roller 22, freeing the roller 22 for the unravelling of the pull cord 34. The handle 18 is maintained in a depressed position by gently holding the handle 18 down with the user's thumb and the user lifting the device 10 with both hands smoothly from the parachute whereby the roller 22 is free to turn and unwind the pull cord 34.

The base 12 or at least the brackets that may also come in a form where these are detachable from the rest of the device to allow a base or brackets of a different size to be attached so that differently configured portions of different chutes can be packed by this device. Also the brackets may come in a form where their configuration relative to the rest of the device is adjustable for the same purpose.

Figure 6A:
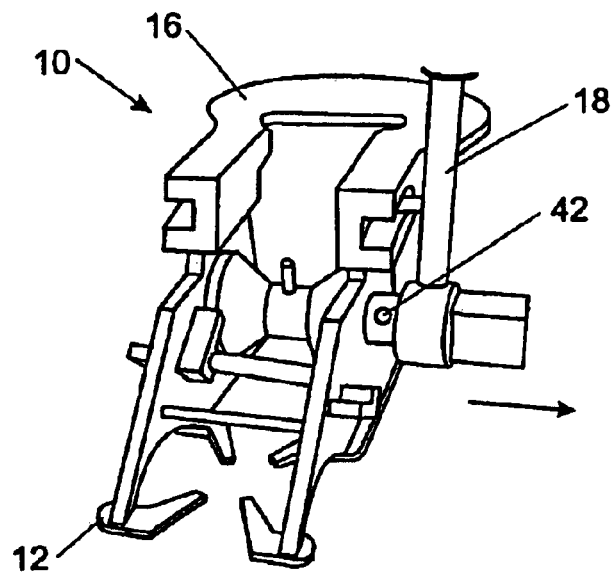
FIGS. 6(a) and 6(b) show the handle being detached from the right side of the device and a new handle inserted into the left side of the device.
Figure 6B:
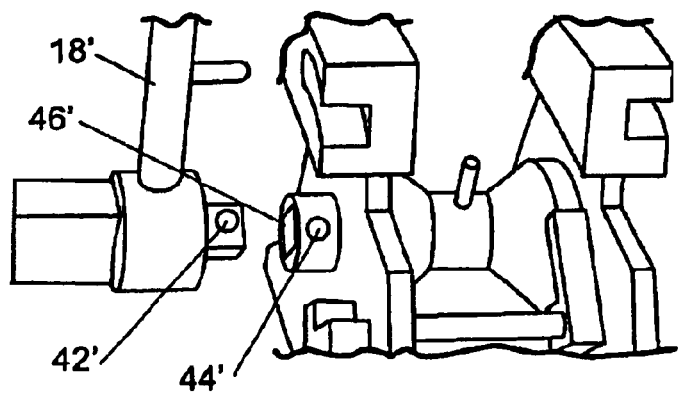
Figure 7:
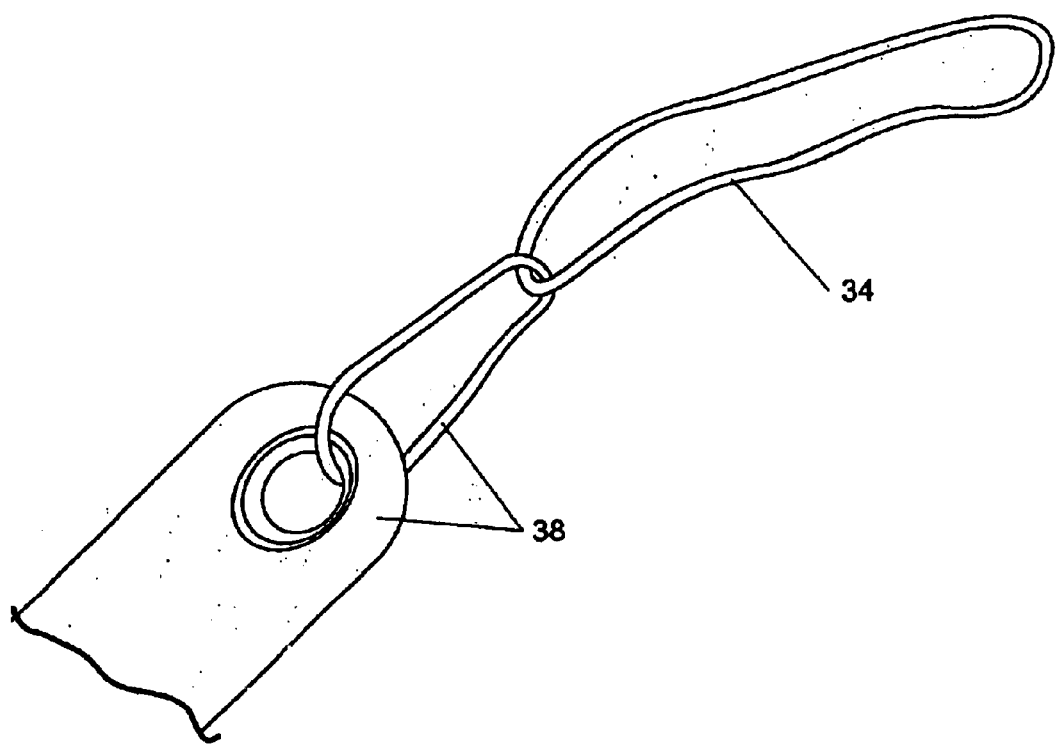
FIG. 7 is a perspective view of part of the closing loop and the pull cord.
Figure 8:
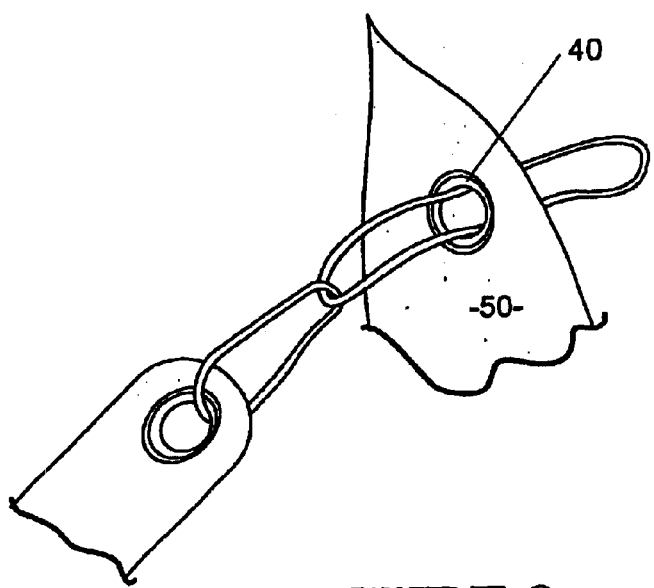
FIG. 8 is a perspective view of part of the closing loop and closing flap with the pull cord extending in past through the grommet.
Figure 9:
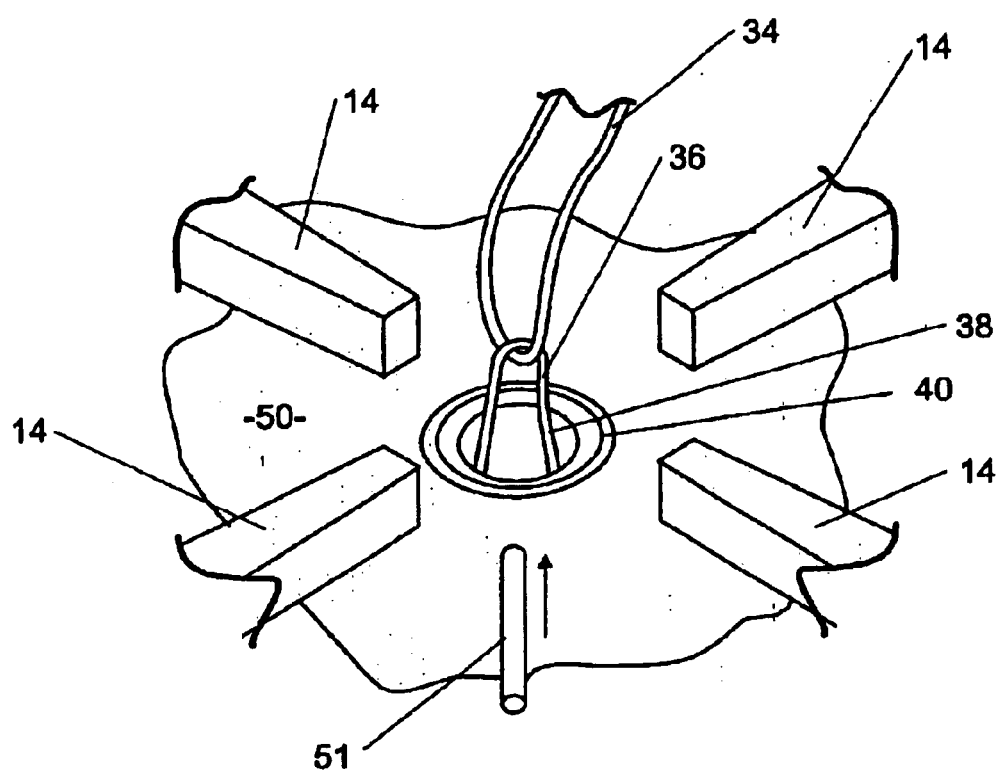
FIG. 9 is a perspective view of part of the device of the invention showing the pull cord extending through the grommet.

FIGS. 6(a) and 6(b) show the handle 18 being detached from the right side of the device 10 and a new handle inserted into the left side of the device 10. This is to cater for left-handed users and is achieved by having a spring-loaded plunger button 42 engaging a corresponding plunger hole 44 in a socket 46 of the device 10. To remove the handle 18 from the socket 46, the plunger button 42 is pushed inwards so that it ceases to engage with the plunger hole 44. The handle 18 is pulled away from the socket 46 while pressing the plunger button 42. The second handle 18' is then oriented such that the plunger button 42' of die second handle 18' faces the left side of the device 10. While the plunger button 42' is pressed, the second handle 18' is inserted into the socket 46' as shown in FIG. 6(b). The spring-loaded plunger button 42' of the second handle 18' will engage the plunger hole 44' and lock the handle 18' in place.

It will be appreciated that the invention provides a device that may be compact and portable, and easy to use. It enables quick engagement and disengagement of a pull cord used to pull the closing loop of a closing cord. It can also be made from standard off-the-shelf components to reduce the cost of manufacture.

The invention is usable with the packing trays of parachutes of various manufacture, but they should preferably have a single closing loop and wide flaps, such as the MECH III Alpha, Techo, Eagle 220 & 260, Maverick, Vega, Tandem, Swift Plus 200 & 225 and Ruby.

While a particular embodiment of the invention has been shown and described, it will be appreciated by those skilled in the art that changes and modifications of the present invention may be made without departing from the invention in broadest aspects. As such, the scope of the invention should not be limited by the particular embodiment and specific construction described herein but should be defined by the appended claims and equivalents thereof. Accordingly, the aim in the appended claims is to cover all such changes and modifications as fall within the spirit and scope of the invention.

What is claimed is:

1. A device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:

a body structure including a base member defining parachute pack engageable regions for bearing onto the parachute pack;

a body structure mounted roller rotatably mounted about a rotational axis and with which a pull cord can engage to be drawn (at least in part) onto said roller and which in use, is connected (directly or indirectly) to the closing cord for drawing said closing cord in part through a said grommet;

a cranking mechanism for rotating said roller about its rotational axis, said cranking mechanism includes a movable handle rotatable about a cranking axis and operatively engaged with said roller to rotate said roller about the said rotational axis for said drawing of said pull cord, wherein said handle actuates rotation of said roller in one direction by movement of said handle in one direction only and in a direction opposite to said one direction, said handle does not actuate rotation of said roller, wherein said device further includes a switch engageable with said cranking mechanism, said switch operable in a first mode to operatively engage said handle and said roller for allowing rotating of said roller and in a second mode to disengage said handle and said roller for freeing said roller and allow roller to rotate independent of said handle, in both directions.

2. A device as claimed in claim 1 wherein said cranking mechanism allows said handle to move in an oscillating manner.

3. A device as claimed in claim 2 wherein said handle oscillates, in use, through an arc of less than 180°.

4. A device as claimed in claim 3, wherein the cranking axis of said handle is parallel to said rotational axis of said roller.

5. A device as claimed in claim 4, wherein the cranking axis of said handle is coaxial with said rotational axis of said roller.

6. A device as claimed in claim 5, wherein said handle and said roller co-rotate.

7. A device as claimed in claim 5, wherein said handle and said roller counter rotate.

8. A device as claimed in claim 5, wherein said cranking mechanism includes a ratchet allowing the actuation of said roller in one direction (the drawing direction) by movement of said handle in said one direction and preventing movement of said roller in a direction opposite to said drawing direction, whilst still allowing said handle to move in its direction opposite.

9. A device as claimed in claim 8 wherein said ratchet includes a moveable pawl rotationally disposed from said body structure and engageable with a complementary toothed structure disposed from said roller, said pawl capable of engaging with said teeth for establishing a ratchet like relationship.

10. A device as claimed in claim 9, wherein said pawl is movable by pivoting relative to said body structure, to a position being of a non ratchet like relationship, with said toothed structure.

11. A device as claimed in claim 10 wherein there is a cross bar parallel to the rotational axis is provided to said body structure over which said pull cord can run and be guided by, said cross bar in use aligning said pull cord extending from said pack in a direction perpendicular to the surface(s) of said base and wherein the rotational axis of roller is offset from said cross bar and to one side of the said direction perpendicular passing through said cross bar, to thereby provide a non obstructing, by said roller, view in the perpendicular direction of said grommet.

12. A device for closing a parachute pack of a kind which has a parachute containing region and at least one opening closable by a plurality of flaps each flap including a grommet, said flaps retainable to a closed condition to close the opening by a closing cord extending through said grommet and secured therewith by a securing pin, said device comprising:
- a body structure including a base member defining parachute pack engageable fingers for bearing onto the parachute pack;
- a body structure mounted roller rotateably mounted about a rotational axis and with which a pull cord can engage to be drawn (at least in part) onto said roller and which in use, in connected (directly or indirectly) to the closing cord for drawing said dosing cord in part through a said grommet;
- a cranking mechanism for rotating said roller about its rotational axis, said cranking mechanism includes a handle operatively engageable with said roller to rotate said roller about the said rotational axis for said drawing of said pull cord,
- wherein said fingers are in a configuration pointing towards each other yet defining a gap which when in use, said fingers rest immediately adjacent said grommet of said flap of said parachute and wherein said grommet is exposed through said gap, wherein said fingers extend inwardly towards the gap.

13. A device as claimed in claim 12, wherein said base member includes at least two fingers.

14. A device as claimed in claim 13, wherein said base member includes four fingers.

15. A device as claimed in claim 13 wherein said roller includes, disposed on opposite axial ends of said roller a cranking mechanism receiving region with which said cranking mechanism can selectively engage, to connect said handle in operative engagement with said roller to rotate said roller about the said rotational axis for said drawing of said pull cord; and
- wherein said cranking mechanism is releasably fastenable at each opposite end of said roller for catering for left hand and right hand operation of the device.

16. A device as claimed in claim 15, wherein each said cranking mechanism receiving region is a socket provided at each end of said roller for engagement with a complementary shaped protruding portion of the cranking mechanism.

17. A device as claimed in claim 16, wherein said socket has at least one aperture on its peripheral surface for receiving with at least one biasing spigot of the protruded portion extending substantially perpendicular to the rotational axis for allowing the releasable fastening.

18. A device as claimed in claim 15 wherein said roller includes an anchor means for securing said pull cord to said roller, when said roller rotates, said anchor means being a pin projecting from the roller radically outwardly.

19. A device as claimed in claim 18 wherein said pin is centrally placed on said roller.

20. A device as claimed in claim 19, wherein there are two pins diametrically opposed to each other.

21. A device as claimed in claim 18 wherein said body structure further includes a handle rotation rotational limit means defining a limit of rotation in direction contrary to operative direction rotational direction of said handle.

22. A device as claimed in claim 21, wherein said limit of rotation is provided by mutual engagement of surfaces of said handle and said body structure.

23. A device as claimed in claims 22, wherein said surface of body structure is provided in a body recess within which a projection from said handle travels.

* * * * *